Sept. 5, 1967          R. L. GLIDDEN          3,339,854
MEANS FOR AXIALLY ADJUSTING A CONICAL ROLLER
Filed Oct. 26, 1964          2 Sheets-Sheet 2
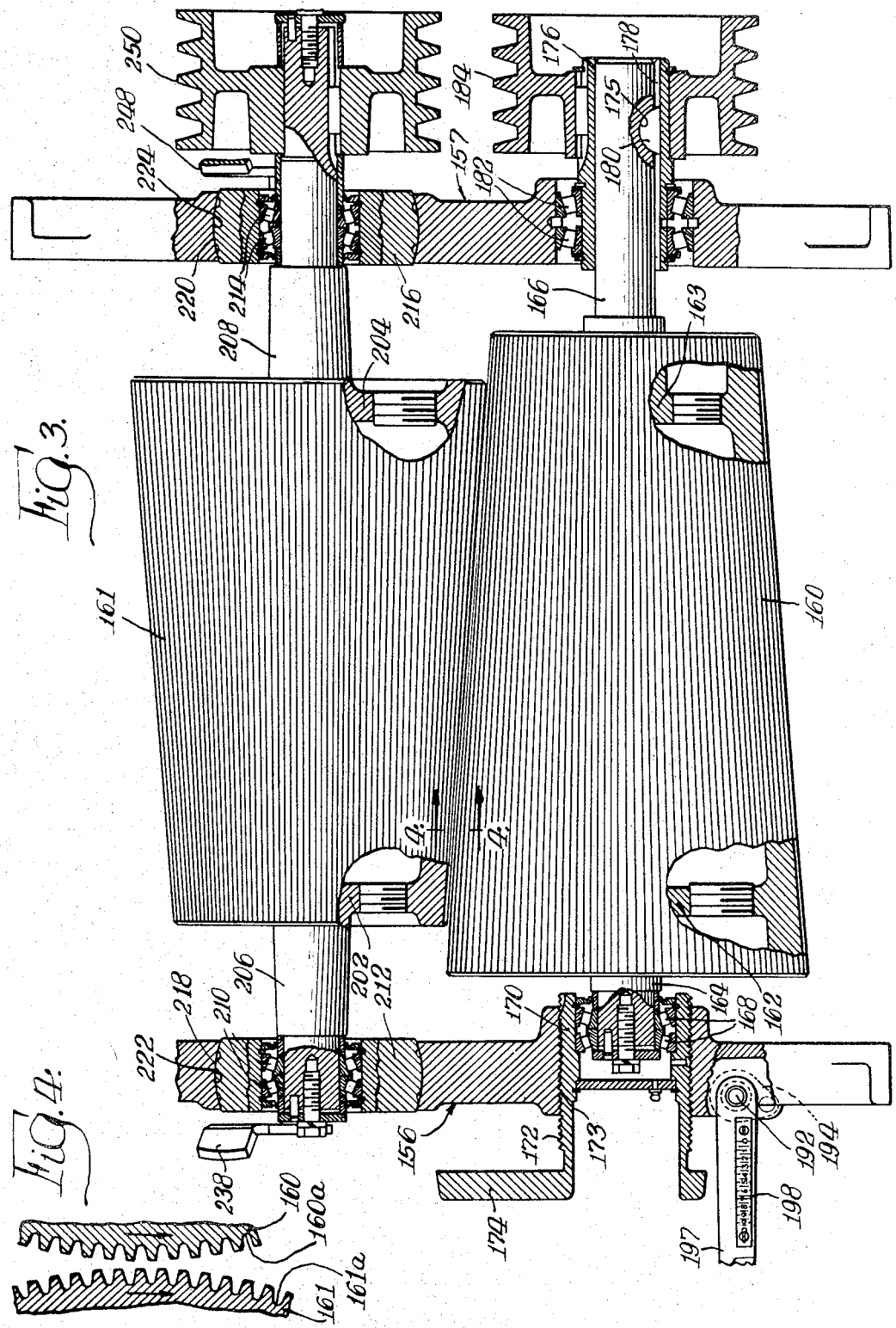

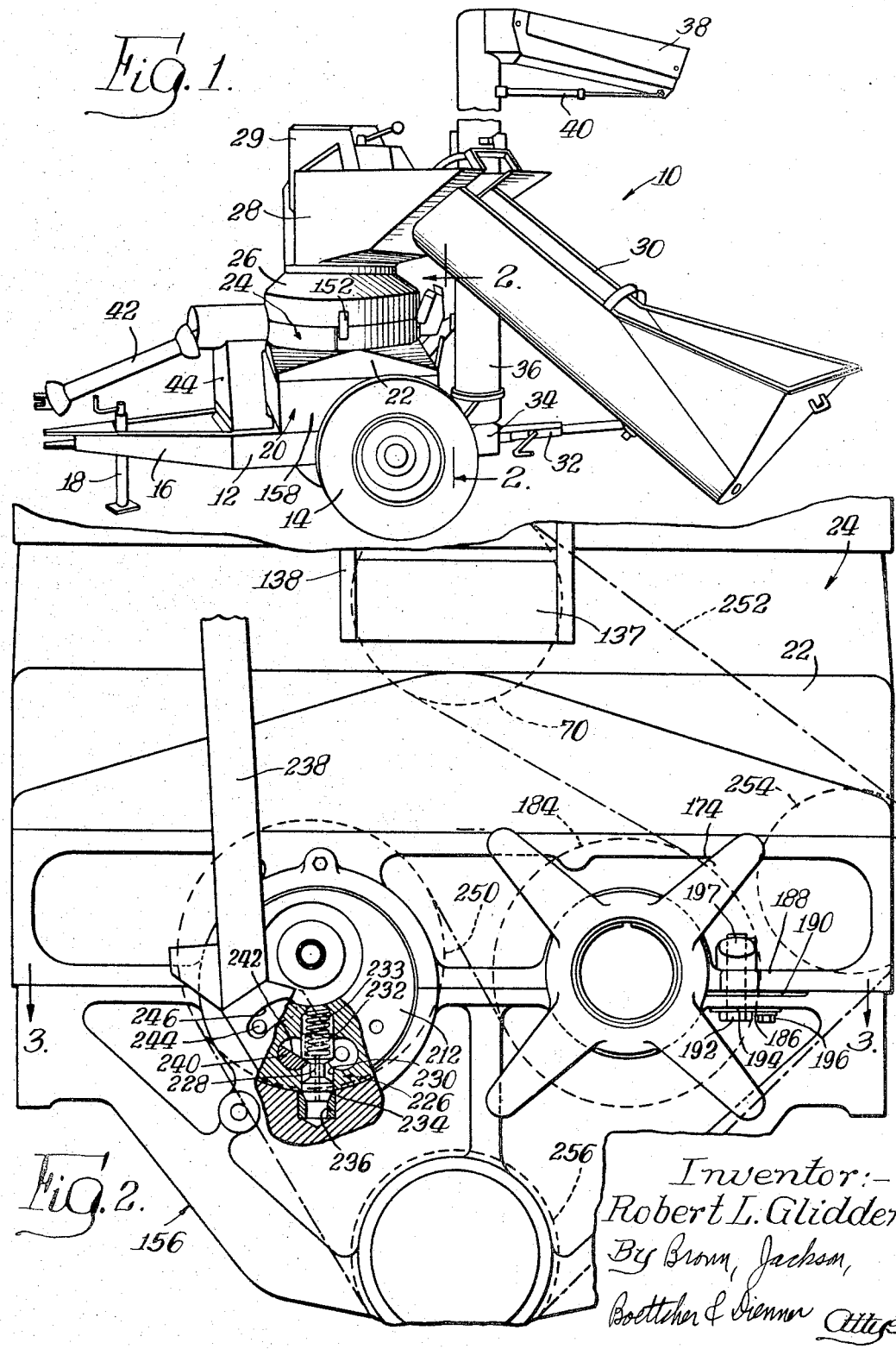

# United States Patent Office 3,339,854
Patented Sept. 5, 1967

3,339,854
MEANS FOR AXIALLY ADJUSTING A CONICAL ROLLER
Robert L. Glidden, Kewanee, Ill., assignor to Kewanee Machinery & Conveyor Company, Kewanee, Ill., a corporation of Illinois
Filed Oct. 26, 1964, Ser. No. 406,430
6 Claims. (Cl. 241—230)

My present invention relates generally to apparatus for processing grain material, such as kernels of corn, and more particularly to a roller mill assembly comprised of a pair of truncated conical rollers and means for axially adjusting one of the rollers relative to the other roller whereby to permit adjustment of the spacing between the rollers.

It is an object of my present invention to provide a roller mill assembly, as described, wherein means including a lever are used for selectively clamping or securing the adjusting means against movement whereby to maintain the adjustable roller in any predetermined axial position.

It is another object of my present invention to provide a roller mill assembly, as described, wherein the adjusting means includes a cross handle with radial spokes, and a lever is pivotally mounted for selective disposal in a position intermediate of two of the spokes of the cross handle to limit accidental rotation of the latter.

It is a further object of my present invention to provide a roller mill assembly, as described, wherein a lever having linear calibrated scale means thereon is selectively disposable adjacent the adjusting handle to indicate the axial position of the latter and the adjustable roller.

It is a still further object of my present invention to provide a roller assembly, as described, wherein a common lever is used for clamping the adjusting means, for limiting rotation of the adjusting handle, and for indicating the axial position of the adjusting handle.

Now in order to acquaint those skilled in the art with the manner of constructing and using apparatus in accordance with the principles of my present invention I shall describe in connection with the accompanying drawings a preferred embodiment of my invention.

In the drawings:

FIGURE 1 is a perspective view of a mobile corn chopper and roller mill unit incorporating the principles of my present invention;

FIGURE 2 is an enlarged fragmentary elevational view, with portions being broken away and shown in section, of the mobile unit of FIGURE 1, taken substantially along the line 2—2 in FIGURE 1, looking in the direction indicated by the arrows;

FIGURE 3 is a horizontal sectional view of the roller mill assembly of my present invention, taken substantially along the line 3—3 in FIGURE 2, looking in the direction indicated by the arrows; and FIGURE 4 is an enlarged fragmentary sectional view, taken substantially along the line 4—4 in FIGURE 3, looking in the direction indicated by the arrows.

Referring now to FIGURE 1, there is indicated generally by the reference numeral 10 a mobile corn chopper and roller mill unit incorporating the principles of my present invention. The mobile unit 10 comprises a chassis or main frame 12 which is supported on an axle and wheel assembly 14. The frame 12 is provided at one end with a triangular extension 16 that serves as a hitch for pivotal attachment to the rear end of a tractor or the like, or to channel rails for a stationary installation. Secured to the triangular extension 16 is a generally vertically extending jack 18 which has a lower end engageable with the ground and which is manually operable for levelling the mill 10. Supported on the main frame 12 in superposed relation are a roller mill housing 20, a roller mill shroud 22, a corn chopper gear housing assembly 24, a generally annular corn chopper shroud 26, a hopper 28 and a feeder auger transmission housing 29. Extending generally angularly downwardly from the hopper 28 is a feeder auger housing 30 having a feeder auger (not shown) mounted therein. The height of the lower end of the feeder auger housing 30 is adapted to be adjusted by means of an extensible jack assembly 32 which, at its one end, is pivotally connected to the housing 30 and, at its other end, is adapted to bear against the main frame 12. Extending longitudinally of the main frame 12 immediately beneath the roller mill housing 20 is a horizontal auger housing 34 which serves to support at one end a generally vertical auger housing 36 provided at its upper end with a lateral auger housing 38. Suitable augers (not shown) are mounted within the auger housings 34, 36 and 38 for conveying milled grain from the bottom of the roller mill housing 20 to an elevated point of discharge. The generally vertical auger housing 36 is arranged to be selectively tilted 25 degrees to either side and to be rotated through 360 degrees. The angular position of the lateral auger housing 38 is adapted to be adjusted by means of an extensible tie rod 40.

The roller mill assembly of my present invention, which will be described in detail hereinafter, may be used alone or in conjunction with a corn chopper assembly as shown. One suitable embodiment of corn chopper assembly, which includes the gear housing assembly 24, and which is arranged, in part, within the shroud 26, is described and claimed in the copending applications of Robert L. Glidden, John H. Fulper and Richard E. Doerfer, Ser. No. 406,429, filed Oct. 26, 1964, and of Robert L. Glidden, Ser. No. 406,431, filed Oct. 26, 1964. The corn chopper and roller mill assemblies of the unit 10 are adapted to be driven from the power takeoff shaft of a tractor through suitable power transmission means including a main drive shaft 42 and sheave and belt means enclosed within a housing 44. The feeder auger within the housing 30 is adapted to be drivingly connected with the corn chopper assembly, as described in the aforesaid copending applications, through transmission gearing within the housing 29. The hopper 28, which is vertically above the corn chopper assembly, is mounted on the shroud 26 for rotation through 360 degrees relative thereto. To permit access to be had to the interior of the corn chopper assembly, the shroud 26 and hopper 28, upon removal of the feeder auger housing 30, are adapted to be tilted or swung upwardly and away from their normal position shown in FIGURE 1. Suitable latch mechanisms 152 may be arranged about the gear housing assembly 24 for engaging catches on the shroud 26 whereby to maintain the latter in closed position.

Arranged immediately beneath the corn chopper assembly and within the housing 20 is the roller mill assembly of my present invention. The roller mill housing 20 is comprised of two-part front and rear walls 156 and 157 (FIGURES 2 and 3), and side walls 158 (FIGURE 1). Mounted within the housing 20, as best shown in FIGURE 3, are a pair of truncated conical or tapered rollers 160 and 161 having longitudinal grooves 160a and 161a (FIGURE 4) formed in their outer peripheries. The roller 160 is a generally hollow cone having apertured radial walls 162 and 163 from which extend opposed axial stub shafts or journal ends 164 and 166. The stub shaft 164 is secured within the inner races of a pair of roller bearing assemblies 168, the outer races of which are secured within the inner end of a sleeve or supporting member 170. The sleeve member 170 is provided with exterior threads 172 that are threadingly received within a threaded opening 173 formed in the front housing wall 156. A cross handle 174 with radial spokes is provided at the outer end of the sleeve member 170. The opposite stub shaft 166 of the roller 160, which is provided with a key slot 175, is received in a sleeve member 176 having an internal axial keyway 178 therein. A Woodruff key 180 is seated in the key slot 175 and projects radially into the keyway 178 whereby to cause the stub shaft 166 to rotate with the sleeve member 176 and yet permit axial movement of the stub shaft 166 relative to the sleeve member 176. The inner end of the sleeve member 176 is rotatably mounted by means of a pair of roller bearing assemblies 182 in the rear housing wall 157. Secured on the outer end of the sleeve member 176 is a sheave 184.

Upon rotation of the cross handle 174 is one direction or the other, the sleeve member 170 is threaded inwardly or outwardly of the housing opening 173 whereby the roller 160 is caused to be moved axially within the roller mill housing 20 and relative to the adjacent roller 161. As shown in FIGURES 2 and 3, and in accordance with the principles of my present invention, suitable means are provided for locking the sleeve member 170 in any predetermined rotative position. In this connection, the front housing wall 156 has rib portions 186 and 188 at the parting line thereof, and formed along the upper surface of the lower rib portion 186 is a narrow recess 190. The recess 190, which is bounded by the two generally parallel wall portions of the ribs 186 and 188, interrupts the threads of the threaded opening 173. Projecting upwardly through the ribs 186 and 188 and the recess 190 is a cap screw 192 the head of which is received within and held against rotation by a lockplate 194 secured to the rib 186 by a screw 196. Threaded onto the upper end of the cap screw 192 is the one end of a generally horizontal lever 197. The lever 197 is so positioned on the cap screw 192 that when it is swung to the forwardly projecting position shown in FIGURE 3, the ribs 186 and 188 are urged relatively toward each other whereby to foreshorten the circumference of the threaded opening 173 for clamping the sleeve member 170 therein. Also, when the lever 197 is in this forwardly projecting position it lies intermediate of two of the spokes of the cross handle 174 thereby limiting accidental rotation of the latter. Still further, the lever 197 is provided with an adjustable linear graduated or calibrated scale 198 with which the inner face of the cross handle 174 may be visually aligned to indicate the axial position of the handle 174 and the roller 160. By reason of this arrangement, any desired axial setting of the roller 160 may be accurately duplicated even though other axial settings have been made in the meantime.

The roller 161 is provided with apertured radial walls 202 and 204 from which extend opposed axial stub shafts or journal ends 206 and 208. The stub shaft 206 is rotatably mounted, by means of a pair of roller bearing assemblies 210, in a bearing block 212, and the stub shaft 208 is similarly rotatably mounted, by means of a pair of roller bearing assemblies 214, in a bearing block 216. The bearing blocks 212 and 216 are respectively formed with spherical surfaces 218 and 220 which are received in spherical seats 222 and 224 in the front and rear housing walls 156 and 157. The axis of rotation of the stub shafts 206 and 208 is spaced from the rotative axis of the bearing blocks 212 and 216. This eccentric mounting of the roller 161, together with the provision of the spherical bearing blocks 212 and 216, permits either or boths ends of the roller 161 to be moved away from the roller 160 by angularly shifting the bearing blocks 212 and 216.

As shown in FIGURE 2, detent means 226 is provided for maintaining the roller 161 in normal operating position shown in FIGURES 2 and 3. The detent means 226 comprises a dumbbell-shaped plunger 228 slidably mounted in a radial recess 230 formed in the bearing block 212. The plunger 228 includes an upper hollow body portion 232 which receives a spring 233, and a lower nose portion 234 that is biased by the spring 233 into engagement with a bushing 236 mounted in the front housing wall 156. A roll release lever 238 is pivotally mounted by means of a pin 240 in the bearing block 212. The pin 240 is formed with a transverse flattened portion 242 that is engageable with the underside of the upper body portion 232 of the plunger 228. A reaction pin 244 at one end is secured in the bearing block 212 and at the other end projects into an arcuate slot 246 formed in the release lever 238. Due to the lost motion connection provided by the pin 244 and slot 246, counterclockwise pivotal movement of the lever 238, as viewed in FIGURE 2, initially causes the pin 240 to rotate causing the flattened portion 242 to raise the plunger 228 so as to release the detent means by withdrawing the nose portion 234 from engagement with the bushing 236. Then, when the upper end edge of the slot 246 engages the reaction pin 244, subsequent counterclockwise pivotal movement of the lever 238 causes rotation of the bearing block 212 thereby swinging the adjacent end of the roller 161 arcuately away from the roller 160. To return the roller 161 to normal operating position, the lever 238 is pivoted clockwise. Initially, the flattened portion 242 is rotated clockwise thereby permitting the spring 233 to bias the plunger 228 radially outwardly. Then, when the lower edge of the slot 246 engages the reaction pin 244, the bearing block 212 is rotated clockwise until the nose portion 234 re-engages or snaps into the bushing 236.

Detent and release means of similar construction and operation are incorporated with the bearing block 216, a roll release lever being indicated at 248. The roll release mechanisms are provided for clearing any material that becomes wedged between the rolls 160 and 161. Through appropriate pivotal movement of the levers 238 and 248, either or both ends of the release roll 161 are first moved away from the roll 160 and then returned to original position. During the cleaning operation, which may be carried out while the rolls 160 and 161 are either rotating or stopped, the axial setting of the roll 160 remains undisturbed and the detent means serve to realign the roll 161 in its original position so that the original roll spacing remains unaffected. In addition, the plunger 228 of the detent means associated with each bearing block 212 and 216 is so arranged that it will move radially inwardly should any foreign object pass between the rolls 160 and 161 thus acting as an automatic safety release. As the nose portion 234 of the plunger 228 is withdrawn from the bushing 236, the bearing blocks 212 or 216, or both, are permitted to rotate allowing the release roll 161 to move away from the adjusting roll 160. After the foreign object has passed between the rolls, the release roll 161 may be returned to its normal operating position by manipulation of the hand levers 238 and 248. As will be readily appreciated, the release roller 161 may be released either manually or automatically. Due to the provision of the spherical or universal mountings of the bearing blocks 212 and 216, one end or the other of the roller 161 may be moved away from the roller 160 by rotation of one of the bearing blocks while the other bearing block swivels in the adjacent spherical seat to accommodate such movement of the roll without distortion of any of the parts. Self-aligning bearing units comprised of cylindrical bearing blocks combined with self-aligning bearings could be used to accomplish the same result. Because the rolls 160 and 161 are tapered or conical, a very exacting vernier adjustment of the roll spacing or separation can be obtained by moving the roll 160 axially. Furthermore, parallelism is maintained between the axes of the rolls 160 and 161 during axial adjustment of the former and regardless of the roll spacing, thus assuring uniform performance of the roller mill at all times. Mounted on the outer end of the stub shaft 208 of the release roll 161 is a sheave 250. Being tapered, the rollers 160 and 161, and their associated journal ends or stub shafts, may be cast integrally whereby to eliminate possible separation between rolls and shafts. For long roll life, the grooves 160a and 161a in the outer peripheries of the rollers 160 and 161 preferably are cast integrally to retain hard cast shearing edges along the boundaries of the grooves. Also, by casting the rollers, manufacturing costs are minimized. Certain features of the roller mill assembly are claimed in the copending application of Richard R. Neebel, Ser. No. 406,428 filed Oct. 26, 1964.

The rollers 160 and 161 are adapted to be driven from the main drive shaft 42. More particularly, as shown diagrammatically in FIGURE 2, a series of endless belts 252 are trained over a drive sheave 70 that has connection with the drive shaft 42, an idler sheave 254, an auger sheave 256 that has connection with the horizontal auger in the auger housing 34, and the roller sheaves 184 and 250. This drive train is enclosed within the housing 44 (FIGURE 1). In connection with this drive train, since the release roller 161 moves in an arcuate path whenever it is released or swung away from the roller 160, the corresponding path of the sheave 250 is such that the tension on the belts 252 does not significantly change during actuation of the release roller 161.

In the operation of the above-described apparatus, the roller 160 is adjusted to and locked in the desired axial position. Next, the drive shaft 42 is connected to a power take-off shaft and the rolls 160 and 161 and other associated devices are thereby rotated. Then ears of corn, with or without shucks, are introduced into the lower end of the feeder auger housing 30 wherefrom they are conveyed upwardly to the hopper 28. From the hopper 28 the ears of corn drop by gravity into the corn chopper assembly where they are fragmentized. These material fragments then drop by gravity to the rollers 160 and 161 of the roller mill assembly. Although both tapered rolls 160 and 161 rotate at the same r.p.m., their mating surface speeds differ up to 30 percent. As a result, small particles or kernels that are smaller than the distance between the rolls are caused to be twisted and thereby fractured and are not permitted to pass directly through the rolls without processing as would be the case with cylindrical rolls. This difference in surface speed also adds a slight shearing action to the rolling process. Since it requires only one-half to three-fourths as much force to fracture by shear as by compression, the power requirements are reduced. The final product leaving the roller mill assembly is conveyed through the horizontal auger housing 34, vertical auger housing 36 and lateral auger housing 38 to the point of discharge. If desired, the roller mill assembly may be used independently of a corn chopper assembly in which case shelled corn or other small grain may be fed directly to the rollers 160 and 161.

While I have shown and described what I believe to be a preferred embodiment of my present invention, it will be understood by those skilled in the art that various rearrangements and modifications may be made therein without departing from the spirit and scope of my invention.

I claim:

1. For use in a roller mill having a housing with at least two walls, the combination of a pair of cooperating rotatable rolls, at least one of said rolls being conical and having oppositely directed journal ends, said conical roll having one of its journal ends rotatable in and axially movable relative to one of the housing walls and having the other of its journal ends rotatable in a supporting member, the other of said housing walls having a threaded opening therethrough with a narrow recess interrupting the threads thereof and being bounded by two generally parallel separated wall portions, said supporting member being threaded in said threaded opening and upon rotation serving to move said conical roll axially for adjusting the spacing between said rolls, and clamp means for urging at least one of said separated wall portions toward the other whereby to foreshorten the circumference of said threaded opening for clamping said supporting member in any predetermined rotative position.

2. For use in a roller mill having a housing with at least two walls, the combination of a pair of cooperating rotatable rolls, at least one of said rolls being conical and having oppositely directed journal ends, said conical roll having one of its journal ends rotatable in and axially movable relative to one of the housing walls and having the other of its journal ends rotatable in a supporting member, the other of said housing walls having a threaded opening therethrough with a narrow recess interrupting the threads thereof and being bounded by two generally parallel separated wall portions, said supporting member being threaded in said threaded opening and upon rotation serving to move said conical roll axially for adjusting the spacing between said rolls, a cross handle having radial spokes at the end of said supporting member exteriorly of said housing, clamp means for urging at least one of said separated wall portions toward the other whereby to foreshorten the circumference of said threaded opening for clamping said supporting member in any predetermined rotative position, and said clamp means including a lever that is pivoted to a position intermediate of two of said spokes of said cross handle when said clamp means is actuated to limit accidental rotation of said cross handle.

3. The combination of claim 2 wherein said lever is provided with a linear calibrated scale to indicate the axial position of said cross handle and said conical roll.

4. For use in a roller mill having a housing, a pair of cooperating rotatable rolls in the housing with at least one of said rolls being conical, means including a handle for axially adjusting said one roll relative to the other roll for varying the spacing between said rolls, a lever pivotally mounted on said housing and having linear calibrated scale means thereon, and said lever being selectively disposable in a position adjacent said handle to indicate the axial position of the latter and said conical roll.

5. For use in a roller mill having a housing with at least two walls, the combination of a pair of cooperating rotatable rolls, at least one of said rolls being conical and having oppositely directed journal ends, said conical roll having one of its journal ends rotatable in and axially movable relative to one of the housing walls and having the other of its journal ends rotatable in a supporting member, said supporintg member being threaded in the other of the housing walls and upon rotation serving to move said conical roll axially for adjusting the spacing between said rolls, a cross handle having radial spokes at the end of said supporting member exteriorly of said housing, a lever pivotally mounted on said housing and selectively disposable in a position intermediate of two of said spokes of said cross handle to limit accidental rotation of the latter, and said lever having a linear calibrated scale thereon to indicate the axial position of said cross handle and said conical roll.

6. For use in a roller mill having a housing with at least two walls, the combination of a pair of cooperating rotatable rolls, at least one of said rolls being conical and having oppositely directed journal ends, said conical roll having one of its journal ends rotatable in and axially movable relative to one of the housing walls and having the other of its journal ends rotatable in a supporting member, said supporting member being threaded in the other of the housing walls and upon rotation serving to move said conical roll axially for adjusting the spacing between said rolls, a cross handle having radial spokes at the end of said supporting member exteriorly of said housing, clamp means cooperating with said housing for clamping said supporting member in any predetermined threaded position, said clamp means including a lever that is pivoted to a position intermediate of two of said spokes of said cross handle when said clamp means is actuated to limit accidental rotation of said cross handle, and said lever having linear calibrated scale means thereon to indicate the axial position of said cross handle and said conical roll.

References Cited
UNITED STATES PATENTS

| | | | |
|---|---|---|---|
| 768,531 | 8/1904 | Kirby | 241—235 X |
| 1,489,695 | 4/1924 | Burns et al. | 241—256 |
| 2,657,131 | 10/1953 | Messing | 241—256 X |
| 2,666,675 | 1/1954 | Rothweiler | 308—178 |

ANDREW R. JUHASZ, *Primary Examiner.*